(12) United States Patent
Pattarello et al.

(10) Patent No.: US 10,995,449 B2
(45) Date of Patent: May 4, 2021

(54) METHOD FOR CONTROLLING A LAUNDRY DRYING MACHINE

(71) Applicant: Electrolux Appliances Aktiebolag, Stockholm (SE)

(72) Inventors: Giorgio Pattarello, Padua (IT); Elena Pesavento, Porcia (IT); Mattia Sessolo, San Dona' di Piave (IT)

(73) Assignee: Electrolux Appliances Aktiebolag, Stockholm (SE)

( * ) Notice: Subject to any disclaimer, the term of this patent is extended or adjusted under 35 U.S.C. 154(b) by 59 days.

(21) Appl. No.: 16/514,255

(22) Filed: Jul. 17, 2019

(65) Prior Publication Data
US 2020/0024794 A1 Jan. 23, 2020

(30) Foreign Application Priority Data

Jul. 19, 2018 (EP) .................................... 18184579

(51) Int. Cl.
*D06F 58/08* (2006.01)
*D06F 58/30* (2020.01)
(Continued)

(52) U.S. Cl.
CPC ............. *D06F 58/30* (2020.02); *D06F 58/02* (2013.01); *D06F 58/08* (2013.01); *D06F 34/28* (2020.02);
(Continued)

(58) Field of Classification Search
CPC .......... D06F 58/30; D06F 58/02; D06F 58/34; D06F 58/38; D06F 34/28; D06F 2101/14;
(Continued)

(56) References Cited

U.S. PATENT DOCUMENTS

| 5,347,727 A | 9/1994 | Kim |
| 6,098,310 A | 8/2000 | Chen et al. |

(Continued)

FOREIGN PATENT DOCUMENTS

| EP | 1852539 A1 | 11/2007 |
| EP | 2610388 A1 | 7/2013 |

(Continued)

OTHER PUBLICATIONS

Extended European Search Report for European Application No. 18184579.3, dated Jan. 17, 2019. 10 Pages.

(Continued)

*Primary Examiner* — John McCormack
(74) *Attorney, Agent, or Firm* — RatnerPrestia

(57) ABSTRACT

A method for controlling a laundry drying machine having a laundry treating chamber and a control unit which receives a signal indicative of laundry moisture from a moisture sensor. The method includes receiving a user input of a laundry treating program, and, in the machine initialization phase, comparing the laundry moisture indicated by the signal to a first threshold, which is stored in the control unit and is indicative of dried laundry or empty threating chamber. If the signal is determined to be equal or less than the first threshold, one or more of the following actions is performed: carrying out only a portion of the selected laundry treating program; skipping the program main phase; starting the program final phase; stopping the laundry treating program; providing a notification of dried laundry and/or empty treating chamber.

16 Claims, 4 Drawing Sheets

(51) Int. Cl.
*D06F 58/02* (2006.01)
*D06F 34/28* (2020.01)
*D06F 58/38* (2020.01)
*D06F 101/14* (2020.01)
*D06F 103/04* (2020.01)
*D06F 103/10* (2020.01)
*D06F 103/38* (2020.01)

(52) U.S. Cl.
CPC .......... *D06F 58/38* (2020.02); *D06F 2101/14* (2020.02); *D06F 2103/04* (2020.02); *D06F 2103/10* (2020.02); *D06F 2103/38* (2020.02)

(58) Field of Classification Search
CPC ............ D06F 2101/20; D06F 2103/04; D06F 2103/10; D06F 2103/38; D06F 2103/00; D06F 2103/08; D06F 58/08; D06F 2105/58; D06F 2105/52
USPC .................................................. 34/483, 528
See application file for complete search history.

(56) References Cited

U.S. PATENT DOCUMENTS

| | | | | |
|---|---|---|---|---|
| 10,443,182 | B2* | 10/2019 | Adkins | D06F 58/30 |
| 2002/0174564 | A1* | 11/2002 | England | D06F 58/30 34/606 |
| 2006/0150437 | A1 | 7/2006 | Tarnowski et al. | |
| 2007/0186438 | A1* | 8/2007 | Woerdehoff | D06F 58/30 34/486 |
| 2009/0071032 | A1* | 3/2009 | Kreutzfeldt | D06F 58/203 34/389 |
| 2014/0115916 | A1* | 5/2014 | Altinier | D06F 58/04 34/282 |

FOREIGN PATENT DOCUMENTS

| | | |
|---|---|---|
| EP | 3162952 A1 | 5/2017 |
| EP | 3252211 A1 | 6/2017 |
| EP | 3239390 A1 | 11/2017 |
| WO | 2018121850 A1 | 7/2018 |

OTHER PUBLICATIONS

European Communication Pursuant to Article 94(3) EPC issued in European Application No. 18 184 579.3, dated Feb. 9, 2021, 4 pages.

* cited by examiner

METHOD FOR CONTROLLING A LAUNDRY DRYING MACHINE

This application claims the benefit of and priority to European Application No. EP 18184579.3, filed on Jul. 19, 2018, which is incorporated herein by reference.

BACKGROUND OF THE INVENTION

Field of the Invention

The present invention generally relates to the field of laundry (linen, clothes, garments and the like) treatment machines, and particularly to laundry drying machines (laundry dryers or laundry washing machines also implementing a laundry drying function, also referred to as washer dryers or combined laundry washers and dryers). Specifically, the present invention relates to a method for controlling a laundry drying machine and a laundry drying machine implementing the method.

Overview of the Related Art

Laundry drying machines exploit a flow of warm air for drying a laundry mass. The laundry mass to be dried is housed in a treating chamber, which quite often comprises a rotary drum accommodated within a machine cabinet and rotatable for causing the laundry to tumble while drying air is forced to pass therethrough (such machines are also called "tumble dryers"). The rotation of the drum causes agitation of the items in the treating chamber that are to be dried, while the items being dried are hit by the drying air flow. Combined laundry washer and dryer appliances combine the features of a washing machine with those of a dryer. In combined laundry washer and dryer appliances, the rotary drum is contained in a washing tub.

Laundry drying machines are known which are equipped with laundry mass moisture measuring systems.

Document EP3239390A1 describes a method for operating a laundry drying machine, the method comprises: starting a drying program for drying the laundry received in the drum, operating a compressor at an initial compressor output; a laundry load indicating or detecting unit determining or estimating a laundry amount at least once during the drying program; setting a threshold value in dependency of the laundry amount; monitoring an operation parameter of the laundry drying apparatus; and operating the compressor at a reduced compressor output if the monitored operation parameter reaches or exceeds the set threshold value.

Document U.S. Pat. No. 5,347,727A1 describes a method for controlling a combined sensing type clothes dryer, comprising the steps of calculating an average value of the sum of a temperature variation per unit time detected by the temperature sensor and a moisture value sensed by the moisture sensor, both of which are detected when a predetermined time has been elapsed from the beginning of the drying operation, determining the fabric quantity of clothes as one of a small fabric quantity, a large fabric quantity and an excessive fabric quantity, based on the calculated average value, and controlling the drying operation, based on the determined fabric quantity.

None of the above cited documents discloses a procedure for detecting a condition of empty treating chamber or dried laundry, in the early phases of a laundry treating program.

New standards and regulations are increasingly aimed at reducing drying times and energy consumption. It is therefore very important to provide arrangements that allow detecting laundry load conditions and/or machine operating conditions so as to assess when it is not required to carry out a regular/complete treatment on laundry contained in the treating chamber, thereby avoiding unnecessary operations of the machine and undesired stresses or damages to laundry due to useless treatments.

SUMMARY OF THE INVENTION

It is an object of the invention to provide an energy-efficient method for controlling a laundry drying machine and an energy efficient laundry drying machine implementing the method.

The object is in particular fulfilled by a method for controlling a laundry drying machine comprising a treating chamber adapted to contain laundry to be treated and a control unit which receives a signal indicative of laundry moisture from a moisture sensor, said method comprising the step of receiving a user input, which includes a laundry treating program comprising a machine initialization phase, a program main phase and a program final phase; the method being characterized by: in said machine initialization phase, comparing the laundry moisture indicated by the signal to a first threshold, which is stored in the control unit and is indicative of dried laundry or empty threating chamber; if the signal is determined to be equal or less than the first threshold, one or more of the following actions is performed: carrying out only a portion of the selected laundry treating program; skipping the program main phase; starting the program final phase; stopping the laundry treating program; providing a notification of dried laundry and/or empty treating chamber.

A laundry drying machine on which the method according to the invention may be carried out is preferably a laundry dryer or a washer dryer. Preferably, the treating chamber, adapted to receive the laundry to be dried, is a drum. The laundry drying machine preferably comprises: a drying air fan, which allows the circulation of the drying process air in the machine; a drying air heater, used to increase the temperature of the process air; an electric motor, for rotating the treating chamber, the same electric motor or a second electric motor driving the drying air fan.

If the laundry drying machine is a recirculating type dryer, it also comprises a laundry moisture condensing device, which may be an air-air type heat exchanger, wherein the drying air is passed through ambient air cooled surfaces of a heat exchanger, or a refrigerant evaporator of a heat pump system, wherein the refrigerant, circulating in the heat pump system, is adapted to absorb/release heat from/to the airflow circulating in the machine. The heat pump system further comprises a refrigerant compressor, which allows the circulation of the refrigerant in the heat pump, and a refrigerant expansion valve.

If the laundry drying machine is a vented type dryer, the drying air is taken from the ambient and then heated up, for example using an electrical resistance. The heated air flows through laundry to be treated, and then it is exhausted from the machine. Preferably, a moisture condensing device may only optionally be present for dehumidifying drying air exhausted from the treating chamber, before its release to the ambient. In this way dried air is exhausted to the ambient.

The laundry drying machine also comprises a control unit, which is programmable to carry out a laundry treating program on laundry. The control unit can comprise for example one or more microprocessors, electronic boards, etc.

The laundry drying machine comprises a moisture sensor for sensing/estimating the laundry moisture in the treating chamber. The moisture sensor provides an indication of the progress of the laundry treating program so as to check when the cycle end condition is reached. Preferably the cycle end condition consist in reaching a predetermined level of residual laundry moisture.

Preferably the moisture sensor comprises a couple of electrodes arranged so as to be touched by laundry contained in the treating chamber during a laundry treating program and/or an arrangement forming a capacitor having said laundry as part of its dielectric.

Other kind of sensors may be used for sensing/estimating the laundry moisture in the treating chamber depending for example on the laundry machine type (laundry dryer or washer dryer), as it will be explained below.

A laundry treating program is set by a user, using a user interface. Preferably, the user interface is an input selector installed on the laundry drying machine. In one embodiment the user interface is available in a remote device which communicates with the laundry drying machine through a wireless communication network. Such a remote device could be a smartphone, a tablet, a computer and the like.

The laundry treating program is divided in three phases: a machine initialization phase, a program main phase and a program final phase.

Preferably, the machine initialization phase comprises detection of physical characteristics like, for example, temperature, pressure, moisture of a fluid circulating within the machine or the moisture of the laundry to be treated, by means of one or more sensors which send signals to the control unit to prepare the machine to carry out a treating program on laundry contained in the treating chamber in an efficient way. Such machine preparation provides for the selection of machine working parameters, such as signal thresholds, operating commands for driving machine components like a motor for rotating the treating chamber and/or a drying air fan, a drying air heater, like an electric resistance or a refrigerant condenser of a heat pump circuit, a component of a heat pump system like the refrigerant compressor or a refrigerant expansion valve.

Preferably, the machine initialization phase also comprises security checks, so as to ensure that the laundry treating program can start in conditions which are appropriate to ensure the user and/or machine safety. Further preferably, the machine initialization phase comprises, for example, a power source checking, for example by verifying that the power main voltage is that prescribed by the machine manufacturer to operate the machine.

In one embodiment, the machine initialization phase comprises a machine warm up phase, wherein the drying air heater and the drying air fan are activated to make process drying air circulating through the treating chamber. Operating the heater and the fan in the machine initialization phase helps to reduce the overall time to carry out a laundry treating program, because many operations, including the drying operation, are made in the same time span, i.e. in parallel, thereby improving the laundry machine performances.

If preferred, the drying air heater and the drying air fan may also be set to be off during the machine initialization phase for reducing the energy consumption, especially in cases wherein the actual execution of the laundry drying phase depends on the operations carried out during the machine initialization phase, for example a laundry moisture estimation. This may be useful when the treating chamber is found out to be empty or the laundry contained in the treating chamber is found out to be already dried. However, to compensate estimation errors on the laundry moisture/presence in the treating chamber, it could be still useful to activate the drying air heater and the drying air fan during the whole or part of the machine initialization phase.

In the machine initialization phase, the control unit, which controls and monitors the overall operations of the laundry drying machine, receives a signal indicative of the moisture of the laundry in the treating chamber, which can be called moisture signal, from one or more sensors.

Preferably, the control unit compares the moisture signal detected by the sensor in a predetermined time to a predefined threshold that indicates a predetermined value of moisture.

In one embodiment of the invention, the moisture signal is compared with a first threshold, which is stored in the control unit and is indicative of dried laundry or empty threating chamber. This operation is preferably performed at a predetermined time during the machine initialization phase. More preferably, this operation is performed after a time interval from the activation of the drying air heater and the drying air fan so as to guarantee a minimum drying time, which, however, does not over-dry laundry that could have been already dry at the beginning of the laundry treating program.

Considering that the signal, detected by the moisture sensor and provided to the control unit, has a path fluctuating between lower and higher values, to determine whether the moisture signal is higher, equal or lower than a threshold many methods can be applied. Such methods substantially provide a comparison condition between the moisture signal and the threshold.

According to one of said methods, the control unit counts how many times the moisture signal is above the threshold, during a time interval wherein detection samples are taken, the control unit then calculates a ratio between said count and the overall number of detection samples. Then, a condition is given to consider such ratio as representative of a signal to be above said threshold. Such condition may consist in a comparison between said ratio and a reference value. Said reference value is determined by means of experimental tests carried out by detecting the moisture signal of laundry loads having known characteristics (moisture, composition, type of laundry, etc.) and the signal provided by the moisture sensor when the laundry treating chamber is empty. The reference value is determined for discriminating the most of the actual conditions of laundry loads effectively present within the treating chamber as being dried, wet or even, assessing that the laundry load is absent.

If the calculated ratio is greater than the reference value then the moisture signal is determined to be above the threshold, while if the ratio is equal or lower than the reference value, the moisture signal is determined to be equal or less than the threshold.

Alternatively, instead of calculating a ratio, the control unit may elaborate the moisture signal to retrieve, for example, a filtered signal or a signal average value to be compared with the threshold. Other methods for determining the relation between the moisture signal and the threshold can provide a condition consisting in having a predetermined number of signal higher values in a predetermined amount of time.

If the moisture signal is determined to be above than the first threshold, the laundry is determined to be wet and the laundry treating program is continued according to the program selected by the user.

If the moisture signal is determined to be equal or less than the first threshold, the laundry is determined to be dried or the treating chamber is determined to be empty.

If the laundry is determined to be dried or the treating chamber is determined to be empty, one or more of the following actions will be performed: carrying out only a portion of the selected laundry treating program; skipping the program main phase; starting the program final phase; stopping the laundry treating program; providing a notification of dried laundry and/or empty treating chamber.

The actions listed above modify the execution of the laundry treating program selected by the user and increase the energy-efficiency of the machine. Any of the actions may be applied singularly or in combination. Carrying out only a portion of the selected laundry treating program allows skipping unnecessary parts of the cycle, allowing time and energy savings.

The program main phase is a program portion wherein most of the drying and/or conditioning treatments, are carried out on laundry. The main phase may comprise a laundry drying operation which reduces the amount of moisture of laundry to a predetermined value, as it will be explained in more details below.

Skipping the program main phase, which is the part of the cycle where most of the energy is consumed, allows a high energy saving. This is particularly useful when either laundry is determined to be dried or the laundry treating chamber is determined to be empty.

The program final phase is a program portion wherein laundry is generally prepared for being removed from the laundry drying machine in a temperature condition which is not harmful for the user. For this reason, and for limiting the wrinkles on laundry, cool air and/or laundry tumbling is provided in such final phase.

Starting the program final phase may be useful when almost dried clothes have been determined to be present in the treating chamber during the machine initialization phase, and hot air has been provided to laundry during such initialization phase, and there may be the necessity of cooling and/or tumbling laundry to achieve a laundry temperature distribution as uniform as possible, said temperature being not harmful for the user when extracting said laundry from the treating chamber. Starting the program final phase is also useful to cool down an empty drum.

Stopping the laundry treating program, on the other hand, may be useful to have the maximum energy saving, particularly in the condition when the treating chamber has been determined to be empty.

Providing a notification of dried laundry and/or empty treating chamber may be particularly useful to inform the user about any of those conditions. The notification may be on the machine, for example in the form of an icon on the user interface or a sound emitted by the machine. Alternatively, it may be a notification provided to a remote device which communicates with the laundry drying machine through a wireless communication network.

In another embodiment of the invention, the moisture signal, indicative of the moisture of the laundry in the treating chamber, is compared to a second threshold, which is stored in the control unit and is indicative of empty treating chamber, and if the signal is determined to be equal or less than the second threshold, the treating chamber is determined to be empty.

Preferably this second comparison is made in the same time interval of the first comparison cited above. Preferably, the second comparison is carried out in the machine initialization phase. The laundry moisture indicated by the second threshold is smaller than the laundry moisture indicated by the first threshold.

Notwithstanding the second threshold is not an essential feature for the invention, but it is only an optional feature, it helps to further discriminate between a condition wherein the treating chamber contains dried laundry and a condition wherein said chamber is actually empty.

If the moisture signal is determined to be higher than the second threshold and equal or smaller than the first threshold, the laundry is determined to be dried.

If the moisture signal is determined to be equal or less than the second threshold, the treating chamber is determined to be empty.

If the treating chamber is determined to be empty, only one or more of the following actions will be performed: stopping the laundry treating program; providing a notification of empty treating chamber.

Limiting the actions that can be performed by the control unit if the treating chamber is determined to be empty is particularly useful to reduce energy consumption and improve the machine efficiency.

On the other end, when only a first threshold is provided, and the machine is not able to distinguish between the dried laundry condition and the empty treating chamber condition, the overall actions performable by a laundry treating machine according to claim 1 may be useful not only when the actual condition is having a dried laundry load within the treating chamber but also when the actual condition is having an empty treating chamber. For example, starting a program final phase may provide positive effects even when the treating chamber is actually empty, because a reduction of the treating chamber temperature may be desired.

Preferably, during the machine initialization phase, it is estimated the quantity/weight and/or type of the laundry in the treating chamber. Further preferably, the estimation of the quantity/weight and/or type of the laundry in the treating chamber is carried out in function of one or more of the following: laundry moisture; temperature of the fluid circulating within the laundry drying machine; an electrical characteristic of a motor power supply; a signal indicative of an airflow circulating through the treating chamber; a signal provided by a weight sensor.

Using only one or a limited number of the listed signals/characteristics can be particularly useful to reduce the machine costs and the number of assembly procedures. On the other hand, using two or more of the listed signals/characteristics allows a higher precision in estimating the quantity/weight and/or type of the laundry. The intensity of the listed signals/characteristics can be proportional to the laundry quantity/weight.

Preferably, the laundry drying machine comprises a plurality of temperature sensors. More preferably, it is provided a first sensor which detects the temperature of the exhaust air exiting the treating chamber and a second temperature sensor which detects the temperature of the intake air entering the treating chamber. An electrical characteristic of a motor power supply may be the current intensity, the voltage or phase. A signal indicative of an airflow circulating through the treating chamber can be provided by a pressure sensor. The signal provided by a weight sensor provides a direct indication of the laundry quantity/weight.

Preferably, the control unit processes the signal indicative of the quantity/weight of the laundry and classifies laundry in one of a plurality, preferably three, different categories or load classes: "small", "medium" and "large". The load classes, in particular the three mentioned classes called "small", "medium" and "large", are defined on the basis of one or more predetermined values that are experimentally calculated, preferably by comparing a known quantity/weight of the laundry with a plurality of estimations that the control unit carries out when such known quantity/weight of the laundry is actually contained in the treating chamber.

Preferably, a laundry treating program execution time is estimated depending on the estimated quantity/weight and/or type of the laundry in the treating chamber. The laundry treating program execution time may be further estimated on the basis of additional characteristics such as user input like the selected laundry treating program, physical conditions of the environment where the laundry treating machine is placed, and the like. In particular, a laundry treating program execution time is associated to each of said categories or load classes. Having an estimation of the laundry treating program execution time is important to avoid over-drying and guarantee a sufficient amount of laundry drying.

Preferably, the laundry treating program execution time is updated according to the comparison of the moisture signal, indicative of the moisture of the laundry in the treating chamber, and a threshold being either the first or the second threshold. Said thresholds are indicative of a predetermined laundry moisture and stored in the control unit.

Preferably, the control unit first estimates the laundry treating program execution time associated to the categories or load classes and then it compares the moisture signal with the first or second threshold. If the moisture signal is determined to be higher than the first threshold, i.e. the laundry is determined to be wet, the laundry treating program execution time remains unchanged. If the moisture signal is determined to be equal or less than the first threshold, i.e. the laundry is determined to be dried or the treating chamber is determined to be empty, one or more of the actions listed in claim 1 will actually take place; the laundry treating program execution time will be modified to take into consideration which actions of claim 1 are actually carried out. A first laundry treating program execution time estimation and a subsequent check of the first estimation is a good method to provide reliable information about the actual laundry treating program execution time which avoids the user to wait an actual time which is longer/shorter than that estimated, and possibly displayed, by the laundry drying machine.

Preferably, the signal indicative of the laundry moisture is generated on the basis of one or more of the following: electrical impedance of the laundry; electrical current flowing through the laundry; permittivity of the laundry.

Using only one or a limited number of the listed laundry characteristics can be particularly useful to reduce the machine costs and the number of assembly procedures. On the other hand, using two or more of the listed laundry characteristics allows a higher precision in estimating the signal indicative of the laundry moisture.

Preferably, the electrical impedance of the laundry is measured by measuring electrodes positioned within the machine so as to be contacted by laundry; the laundry moisture is determined on the basis of the impedance and/or current measurement.

Preferably, using a capacitor in a laundry drying machine, said capacitor having, as part of the capacitor dielectric, the laundry mass, the capacitance of said capacitor varies according to the permittivity of the laundry mass that, in turn, varies with the laundry moisture during a drying process. Therefore, by measuring the capacitance of said capacitor it is possible to generate a signal indicative of the laundry moisture. Preferably such measurement is made by means of an electronic circuitry electrically supplied by a supply voltage and a reference voltage. Preferably, the provision of said capacitor comprises: providing in the laundry machine at least one conductive plate which forms a plate of said capacitor, and exploiting, as a second plate of said capacitor, routing lines distributing inside the laundry drying machine said reference voltage.

Preferably, the program main phase comprises one or more of: a laundry drying operation; heating an airflow to be passed through the treating chamber by means of a drying air heater, supplying a treating substance to the laundry.

In the laundry treating operation, water present in the laundry is removed by hot and optionally dried air which can be provided to the treating chamber by means of an open circuit or by a closed circuit which recirculates air through the treating chamber. In case of an open circuit, it may be sufficient to heat up ambient air and driving it to the treating chamber, without the need of dehumidifying such air exhausted from said chamber.

In the program main phase a treating substance may be supplied to the laundry, if the user has previously selected this option during the laundry treating program selection or whether the laundry treatment program includes such treatment among the operations to be carried on laundry. Preferably, the treating substance may be provided in the form of steam, or in liquid form such as mist or a spray, and said substance may be a fragrance, a conditioning agent/chemical or an additive.

Preferably, the program main phase comprises a laundry drying operation which reduces the amount of moisture of the laundry to a predetermined value.

Preferably, a portion of the program main phase overlaps the machine initialization phase. Preferably, the control unit activates the drying air heater during the initialization phase, in order to reduce the drying time of the laundry and improve the machine performances. Alternatively, the control unit keeps the drying air heater off during the initialization phase, in order to increase the energy savings. This condition is particularly advantageous if the drum is considered empty or the laundry is considered dried.

Preferably, the operation of carrying out only a portion of the selected laundry treating program when the laundry is determined to be dried or the treating chamber is determined to be empty, comprises: performing one or more time-driven portions of the laundry treating program; supplying a treating substance to the laundry.

Carrying out only a portion of the selected laundry treating program allows skipping unnecessary parts of the cycle, allowing time and energy savings. Since the laundry is determined to be dried or the treating chamber is determined to be empty there is no need to let the program continuing on the basis of the signal provided by the moisture sensor. It is efficient to just perform those parts of the laundry treating program that have a predetermined duration time, i.e. the so called time-driven portions, such as ventilating laundry within the treating chamber.

Preferably, if the user during the laundry treating program selection chooses particular program options, such as supplying a treating substance to the laundry, these program portions will be performed if the laundry is determined to be dried and preferably they are not performed if the treating chamber is determined to be empty.

Preferably, the program final phase comprises a laundry cooling and/or laundry tumbling operation. Preferably, the cooling phase is included to reduce the temperature of the laundry in the treating chamber and avoid the risk that the user comes in contact with laundry at a high temperature.

Preferably, the laundry tumbling phase is useful to avoid wrinkles formation on laundry.

Preferably, the notification that laundry is determined to be dried and/or the treating chamber is determined to be empty, comprises a request for introducing or removing laundry to/from the treating chamber. In this way, the user can take appropriate actions to have the selected treating program efficiently performed, or not performed at all.

Preferably, if the laundry is determined to be dried, the control unit provides a first notification to the user, so as the user can remove already dried laundry from the treating chamber, thereby avoiding over-drying. Preferably, the control unit provides a second notification to the user if the treating chamber is empty, so as the user can introduce the laundry in the treating chamber.

Preferably, the notification is provided to a remote device which communicates with the laundry drying machine through a wireless communication network. Preferably, the wireless communication network comprises Internet, a router WiFi, a cellular communication network, etc.

The present invention further relates to a laundry drying machine comprising a treating chamber adapted to contain laundry to be treated and a control unit which receives a signal indicative of laundry moisture from a moisture sensor, the laundry drying machine is characterized in that the control unit is programmed for carrying out a method having the features disclosed above, and in particular the features as recited in claim 1.

Preferably the moisture sensor comprises a couple of electrodes arranged so as to be touched by laundry contained in the treating chamber during a laundry treating program and/or an arrangement forming a capacitor having said laundry as part of its dielectric.

DETAILED DESCRIPTION OF EXEMPLARY AND NON-LIMITATIVE EMBODIMENTS OF THE PRESENT INVENTION

Figure 1:
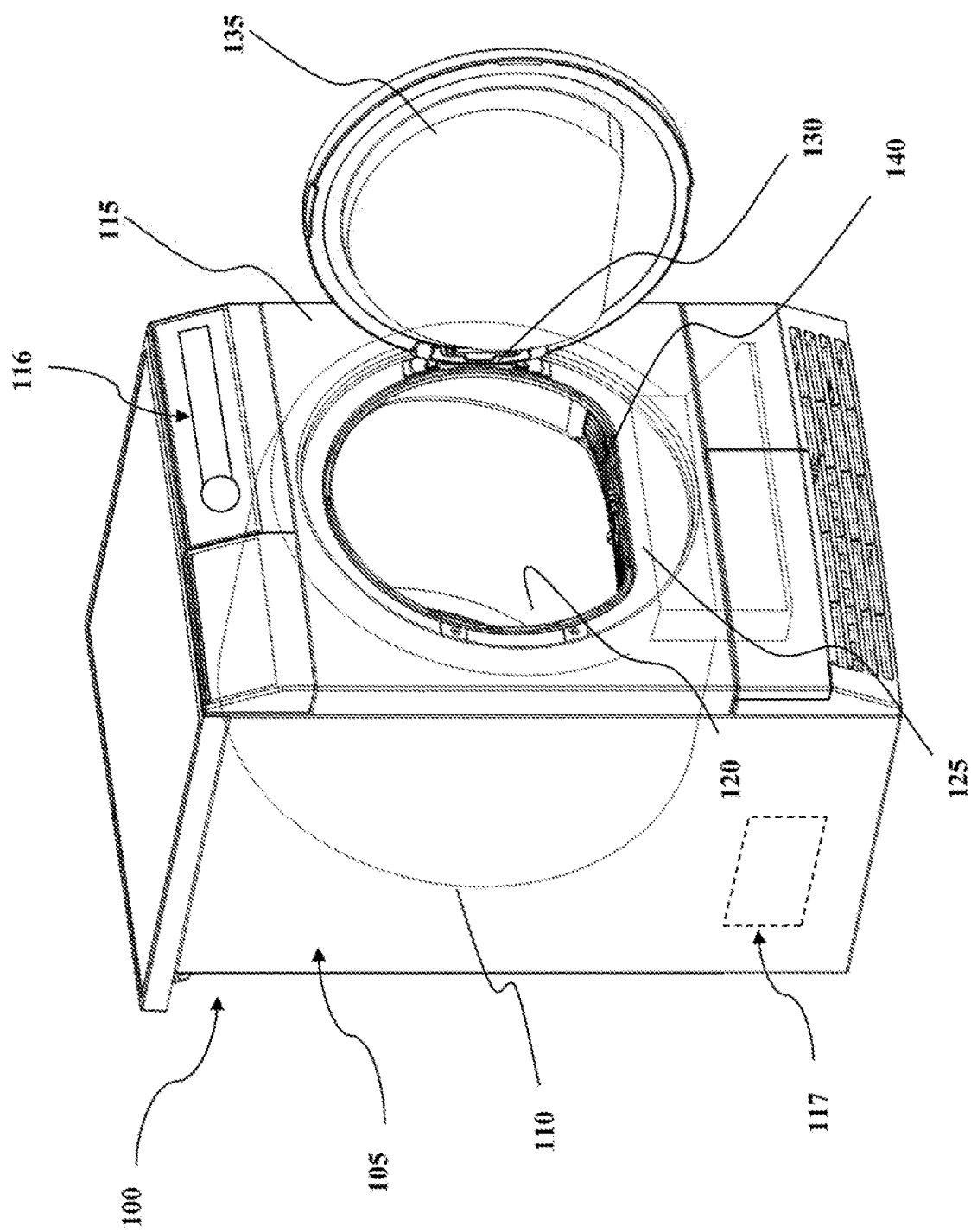
FIG. 1 shows in a perspective view a laundry drying machine according to an embodiment of the present invention.

With reference to the drawings, in FIG. 1 there is shown in a perspective view a laundry drying machine 100 according to an embodiment of the present invention, for example, although not limitatively, a laundry dryer, particularly a tumble dryer. It is pointed out that although here and in the following description reference is made to a laundry dryer, this is not to be construed as a limitation, because the present invention also covers and applies to combined laundry washers and dryers (i.e., laundry washing machines also having a laundry drying function).

The laundry drying machine 100 comprises a cabinet 105, for example parallelepiped-shaped. The cabinet 105 accommodates therein a treating chamber 110 for the laundry mass to be dried. The treating chamber 110 is for example defined by the inner space of a rotatable drum which is adapted to contain the laundry mass to be dried (in a combined laundry washer and dryer appliance, the treating chamber comprises a washing basket or drum which is contained in a washing tub). The cabinet 105 also encloses the electrical, electronic, mechanical, aeraulic and hydraulic components necessary for the operation of the laundry drying machine 100.

The laundry drying machine 100 comprises a control unit 117, schematically shown in FIG. 1, which is programmable to carry out a laundry treating program on laundry. The control unit 117 can comprise for example one or more microprocessors, electronic boards, etc.

A front panel 115 of the cabinet 105 has a loading opening 120 providing an access to the rotatable drum 110 for loading/unloading the laundry mass to be dried. The loading opening 120 has a rim 125, preferably substantially annular, in which door hinges 130 as well as door locking means (not shown) are arranged for, respectively, hinging and locking a door 135. The door 135 is adapted for sealably closing the loading opening 120 during the laundry treating program.

The front panel 115 also comprises a user interface 116. Preferably, the user interface is an input selector installed on the front panel 115. In another embodiment the user interface may be available in a remote device which communicates with the laundry drying machine through a wireless communication network. Such a remote device could be a smartphone, a tablet, a computer and the like.

The laundry drying machine 100 comprises a drying air circulation system, for causing drying air to circulate through the drum 110 where the laundry to be dried is loaded. The drying air circulation system is not shown in the drawings, not being of relevance for the understanding of the present invention. Any known drying air circulation system can be adopted, for example an open-loop drying air circulation system (in which drying air is: taken in from the outside ambient, heated up, caused to flow through the drum 110 to extract moisture from the laundry to be dried, then possibly de-moisturized and cooled down and finally exhausted to the outside ambient) or a closed-loop drying air circulation system (in which the drying air is: heated up, caused to flow through the drum 110 to extract moisture from the laundry to be dried, de-moisturized and cooled down, and then again heated up and reintroduced in the drum). The drying air de-moisturizing and cooling system or moisture condensing system can comprise an air-air heat exchanger or a heat pump exploiting a suitable refrigerant fluid. The drying air heater can comprise a Joule-effect heater; in case of use of a heat pump, one of the heat exchangers of the heat pump (refrigerant evaporator) is used to cool down the moisture-laden drying air, while another heat exchanger (refrigerant condenser) of the heat pump can advantageously be exploited for heating the drying air.

The drying air circulation system can for example be designed such that the drying air is introduced into the drum 110 at or proximate to the rear portion thereof (rear with respect to the machine front, corresponding to the front panel 115). After flowing through the drum 110 (and hitting the laundry mass contained therein), the drying air can leave the drum 110 passing through an opening 140 provided close to the rim 125 of the loading opening 120, on the inner side thereof (i.e., looking the machine frontally, behind the rim 125 of the loading opening 120).

Figure 2:
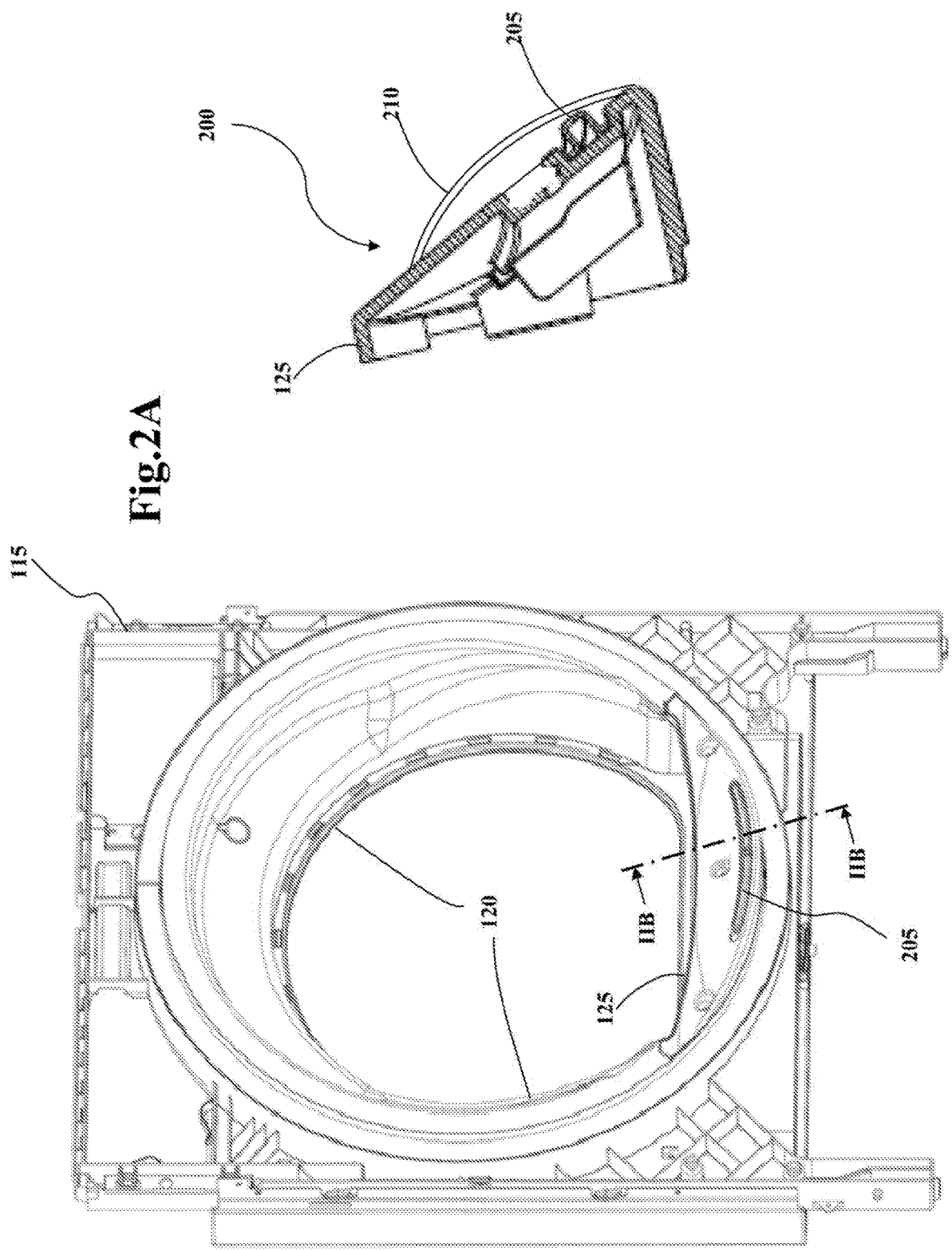
FIGS. 2A and 2B show details of the laundry drying machine of FIG. 1, illustrating an exemplary arrangement of a plate of a condenser having the laundry mass to be dried as (part of) the condenser dielectric.

The laundry drying machine comprises a moisture sensor 200. In the embodiment shown in the figures the moisture sensor 200 comprises an arrangement forming a capacitor having said laundry as part of its dielectric. FIG. 2A is a view of the front panel 115 from behind, showing the inner side of the loading opening rim 125, facing towards the drum 110 (in FIG. 2A, the front panel 115 is shown dismounted from the rest of the cabinet 110). FIG. 2B is a partial cross-sectional view along lines IIB-IIB indicated in FIG. 2A. There is shown a conductive plate member, e.g. a metal plate 205 (being part of the moisture sensor for measuring the moisture of the laundry to be dried), that is mounted to the inner side of the cabinet front panel 115, in the shown example just below the rim 125 of the loading opening 120, so as to face the drum 110 and, in operation, being in front of the laundry mass to be dried that, while it tumbles inside the rotatable drum 110, falls by gravity to the bottom of the drum 110. Preferably, the conductive plate 205 is arranged so as to not be directly touched by the laundry, being to this purpose protected, covered by a dielectric cover 210, e.g. made of plastic.

A more detailed description of this type of moisture sensor is explained in the application EP3162952A1 of the same Applicant to which the present description refers to.

Figure 3:
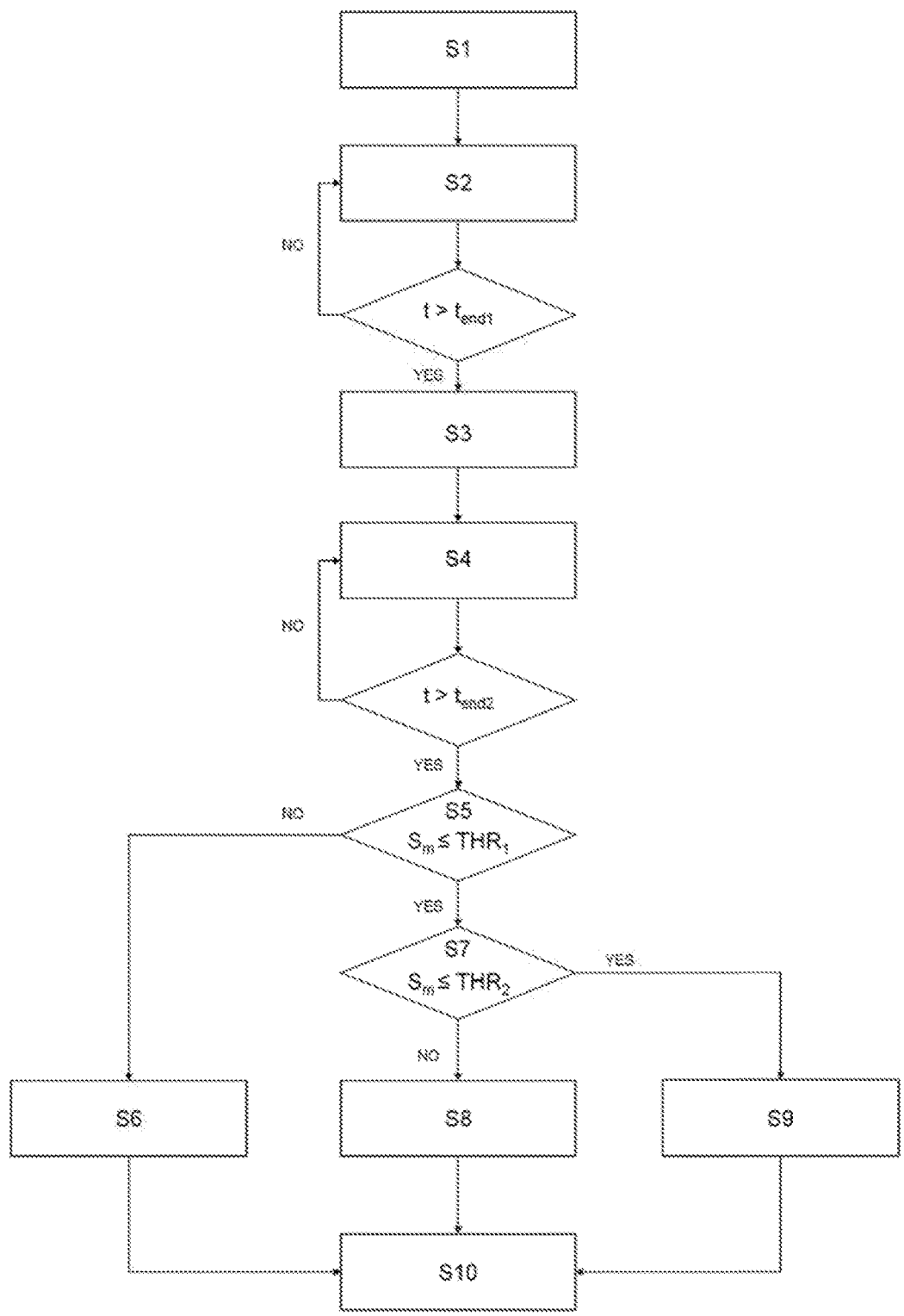
FIG. 3 schematically shows a flow-chart illustrating an embodiment of the method for controlling a laundry drying machine according to the invention.

FIG. 3 schematically shows a flow-chart illustrating an embodiment of the method for controlling a laundry drying machine according to the invention.

At step S1 a laundry treating program is set by a user, using the user interface 116 shown in FIG. 1, and the program is then started, for example by pressing/touching a button on an input selector installed on the front panel 115.

After the program is started, a machine initialization phase takes place, wherein the control unit 117 receives a signal $S_m$ that will be used for the estimation of the quantity/weight of the laundry in the treating chamber 110. In this embodiment such signal $S_m$ is provided by the moisture sensor 200 (Step S2). Such signal $S_m$ is received for a predetermined amount of time $t_{end1}$ from the start of the program, such amount being preferably set to 90 sec. Preferably, the machine initialization phase comprises a machine warm up phase, wherein the drying air heater and the drying air fan (not illustrated) are activated to make process drying air circulating through the treating chamber 110. The machine initialization phase may, however, be carried out without activating the drying air fan and the drying air heater or activating, i.e. turning on, the drying air fan only.

Once the predetermined amount of time $t_{end1}$ is over, in Step S3 the control unit 117 processes the signals $S_m$ received from the moisture sensor 200 and estimates the quantity/weight of the laundry in the treating chamber 110. Once the estimated quantity/weight of the laundry is available, the control unit 117 classifies laundry in one of a plurality of different categories or load classes. Preferably, the classification is obtained by comparing the estimated quantity/weight of the laundry with one or more predetermined values, stored in the control unit 117 and indicative of a predetermined laundry quantity/weight. Preferably there are three load classes: "small", "medium" and "large". For example, if the value of the estimated quantity/weight of the laundry is below a predetermined value $W_1$, the load class "small" is assigned; if the value of the estimated quantity/weight of the laundry is above a predetermined value $W_2$, the load class "large" is assigned; if the value of the estimated quantity/weight of the laundry is below $W_2$ and above $W_1$, the load class "medium" is assigned. The predetermined values ($W_1$, $W_2$) are experimentally calculated, preferably by comparing a known quantity/weight of the laundry with a plurality of estimations that the control unit 117 carries out when such known quantity/weight of the laundry is actually in the treating chamber 110. Values ($W_1$, $W_2$) are calculated such that the estimations carried out by the control unit 117 well approximate the real quantity/weight of laundry in the treating chamber 110, limiting as much as possible erroneous estimations. Each load class is associated with a laundry treating program execution time $t_{pc}$, such time is then estimated by the control unit 117 once the laundry load contained in the treating chamber is classified in one of said load classes.

During Step S4 the control unit 117 acquires the signal $S_m$ indicative of the moisture of the laundry in the treating chamber 110 from the moisture sensor 200 for a predetermined time interval $t_{end2}$, which may be set from 10 to 15 minutes from the start of the program or from the end of Step S3.

In Step S5 the control unit 117 determinates the relation between signal $S_m$ and a first threshold $THR_1$ to assess whether the laundry contained in the treating chamber 110 is wet, or, instead, the laundry is dry or the treating chamber 110 is empty. In this embodiment, in Step S5, the control unit 117 counts how many times the moisture signal $S_m$ detected during time interval $t_{end2}$ is above a first threshold $THR_1$, which is stored in the control unit 117 and is indicative of dried laundry or empty threating chamber 110. The control unit then calculates a ratio between said count and the overall number of detection samples taken during time interval $t_{end2}$. Then, said ratio is compared to a reference value which is determined experimentally. If the ratio is greater than the reference value then the moisture signal $S_m$ is determined to be above the threshold $THR_1$, while if the ratio is equal or lower than the reference value, the moisture signal $S_m$ is determined to be equal or less than the threshold $THR_1$.

If the moisture signal $S_m$ is determined to be above the threshold $THR_1$, the laundry is determined to be wet and the laundry treating program is continued (Step S6) according to the program selected by the user. If the moisture signal $S_m$ is determined to be equal or less than the first threshold $THR_1$, the laundry is determined to be dried or the treating chamber 110 is determined to be empty and the process is continued to Step S7.

At Step S6 starts the program main phase, which is the program portion wherein the most of the drying and/or conditioning treatments are carried out on laundry. In this phase the drying air heater and the drying air fan are kept working, or activated, and a flow of warm air circulates in the machine for drying the laundry in the treating chamber 110. The rotation of the treating chamber 110, in the form of a drum, causes agitation of the laundry items so that they are hit by the drying air flow and thereby dried.

The program main phase may end when a predetermined level of laundry moisture, which depends from the selected laundry treating program or which is set by the user, is reached. The program main phase may further end when a predetermined duration time is elapsed. Such duration time being dependent from the laundry treating program or from the settings provided by the user.

At the end of the program main phase, the program final phase starts, in such final phase the drying air heater is deactivated and the laundry is prepared for being removed from the laundry drying machine 100, preferably providing cool air and/or laundry tumbling. The laundry treating program is then ended at Step S10.

At step S7, the signal $S_m$ is then compared to a second threshold $THR_2$ which is stored in the control unit 117 and is indicative of empty treating chamber 110. The laundry moisture indicated by the second threshold $THR_2$ is smaller than the laundry moisture indicated by the first threshold $THR_1$.

If the signal $S_m$ is determined to be above the second threshold $THR_2$ while being equal or smaller than the first threshold $THR_1$, the laundry is determined to be dried and the Step S8 takes place. In Step S8 one or more of the following actions will be performed:

carrying out only a portion of the selected laundry treating program;
skipping the program main phase;
starting the program final phase;
stopping the laundry treating program;
providing a notification of dried laundry and/or empty treating chamber 110.

In this embodiment, in Step S8, the program main phase is skipped and the program final phase is started. During the program final phase the drying air heater is deactivated and the laundry is prepared for being removed from the laundry drying machine 100, preferably providing cool air and/or laundry tumbling. The program final phase may have a predetermined duration time. After Step S8 is completed, the laundry treating program is ended at Step S10.

If in the Step S7 the signal $S_m$ is determined to be equal or less than the second threshold $THR_2$, the treating chamber 110 is determined to be empty and Step S9 is carried out. In Step S9, the laundry treating program is stopped and/or a notification of empty treating chamber is provided to the user. Preferably, the notification comprises a request for the user to introduce laundry in the treating chamber 110. Further preferably, the notification is provided to a remote device which communicates with the laundry drying machine 100 through a wireless communication network.

After the Step S9 is completed, the laundry treating program is ended at Step S10 and, a new laundry treating program may be started, in particular when the user has actually introduced laundry in the treating chamber 110 as prompted by the laundry drying machine 100.

In Step S7 the determination of the relation between signal $S_m$ and the second threshold $THR_2$ may be made in the same way described above with reference to the assessment of the relation between signal $S_m$ and the first threshold $THR_1$.

Figure 4:
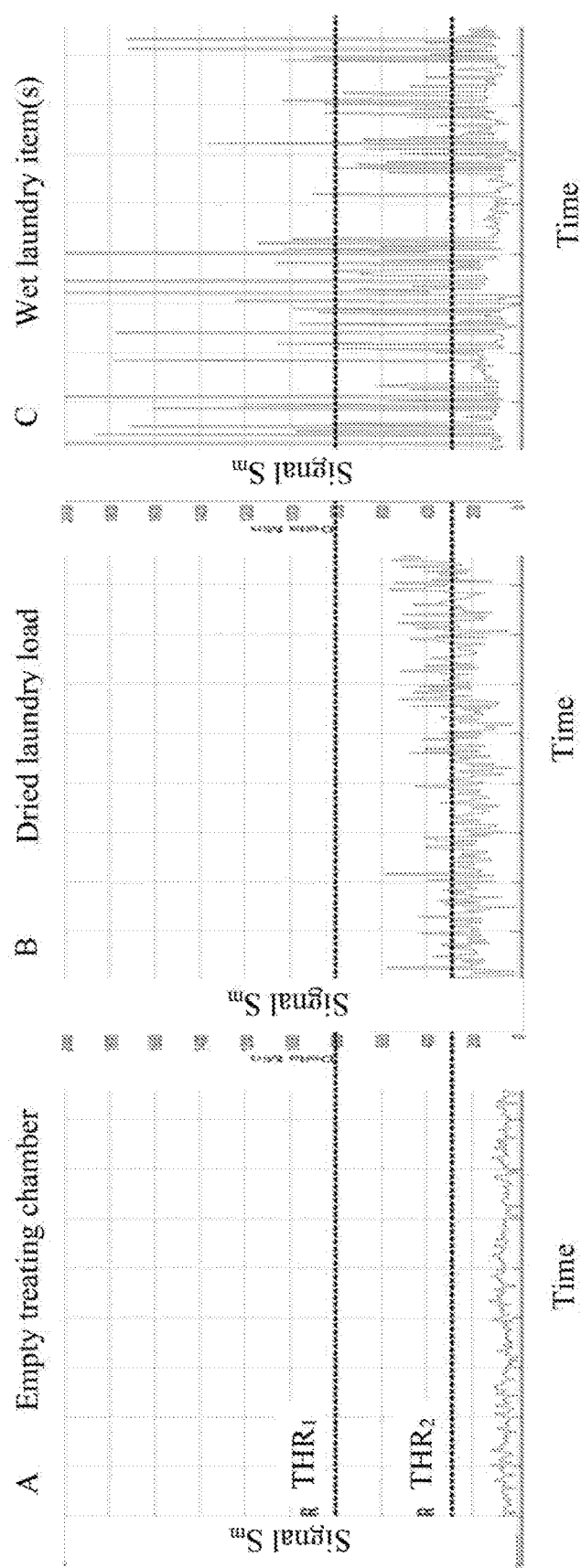
FIG. 4 shows graphs A-C illustrating the intensity of the signal $S_m$ in three different conditions: empty treating chamber, dried laundry load and wet laundry item(s).

FIG. 4 shows graphs illustrating the intensity of the signal $S_m$ in three different conditions of the laundry treating chamber 110: graph (A) shows a signal $S_m$ provided when the treating chamber 110 is empty, graph (B) shows a signal $S_m$ provided when the treating chamber 110 contains a dried laundry load, while graph (C) shows a signal $S_m$ provided when the treating chamber 110 contains one or more wet items. As clearly visible in FIG. 4, the signal $S_m$ that is detected by the moisture sensor 200 and provided to the control unit 117, is not constant during the measuring time but it has a path fluctuating between lower and higher values. Therefore the control unit 117 has to carry out one of the methods described above, such as that disclosed at Steps S5, S7, in order to compare the signal $S_m$ with the thresholds $THR_1$ and $THR_2$.

From the above description it is clear how the invention solves the previous mentioned aim and objects. The method for controlling a laundry drying machine according to the invention is able to detect a condition of empty treating chamber and/or a treating chamber containing a dried laundry load in an early stage of a laundry treating program. In this way it is possible executing specific actions aimed to reduce the laundry drying time and improve the machine performances, thereby avoiding unnecessary operations of the machine and undesired stresses or damages to laundry due to useless treatments.

The invention claimed is:

1. A method for controlling a laundry drying machine comprising a treating chamber adapted to contain laundry to be treated and a control unit configured to receive a signal ($S_m$) indicative of laundry moisture from a moisture sensor, the method comprising:
receiving, at the laundry drying machine, a user selection of a laundry treating program comprising a machine initialization phase for detecting physical parameters of the laundry and/or of the laundry drying machine, a program main phase for tumbling the laundry while a heater is ON, and a program final phase for tumbling the laundry while the heater is OFF;
performing a machine initialization phase including comparing the laundry moisture indicated by the signal ($S_m$) to a first threshold ($THR_1$), which is stored in the control unit and is indicative of dried laundry or an empty treating chamber; and
upon determining that the signal ($S_m$) is equal to or less than the first threshold ($THR_1$), maintaining the heater OFF while performing one or more of the following:
skipping the program main phase by not performing the program main phase and by starting the program final phase, and
stopping the laundry treating program by not performing the program main phase and not performing the program final phase.

2. The method according to claim 1, further comprising:
comparing the laundry moisture indicated by the signal ($S_m$) to a second threshold ($THR_2$), which is stored in the control unit and is indicative of an empty treating chamber; and
upon determining that the signal ($S_m$) is equal to or less than the second threshold ($THR_2$), determining that the treating chamber is empty.

3. The method according to claim 2, further comprising, upon determining that the treating chamber is empty, performing only one or more of:
stopping the laundry treating program; and
providing a notification of empty treating chamber.

4. The method according to claim 2, wherein the machine initialization phase further comprises estimating the quantity/weight and/or type of the laundry in the treating chamber.

5. The method according to claim 4, wherein estimating the quantity/weight and/or type of the laundry in the treating chamber is carried out in function of one or more of:
laundry moisture;
temperature of a fluid circulating within the laundry drying machine;
an electrical characteristic of a motor power supply;
a signal indicative of an airflow circulating through the treating chamber; and
a signal provided by a weight sensor.

6. The method according to claim 5, further comprising estimating a laundry treating program execution time ($t_{pe}$) depending on the quantity/weight and/or type of the laundry in the treating chamber.

7. The method according to claim 6, further comprising updating the laundry treating program execution time ($t_{pe}$) according to the comparison of the laundry moisture indicated by the signal ($S_m$) and either the first threshold ($THR_1$) or the second threshold ($THR_2$).

8. The method according to claim 1, further comprising generating the signal ($S_m$) indicative of the laundry moisture on the basis of one or more of:
- electrical impedance of the laundry;
- electrical current flowing through the laundry; and
- permittivity of the laundry.

9. The method according to claim 1, wherein the program main phase comprises one or more of:
- a laundry drying operation;
- operating a drying air heater to heat an airflow to be passed through the treating chamber; and
- supplying a treating substance to the laundry.

10. The method according to claim 9, wherein a portion of the program main phase overlaps the machine initialization phase.

11. The method according to claim 1, wherein carrying out only a portion of the selected laundry treating program comprises:
- performing one or more time-driven portions of the laundry treating program; and
- supplying a treating substance to the laundry.

12. The method according to claim 1, wherein the program final phase comprises a laundry cooling and/or tumbling operation.

13. The method according to claim 1, providing a notification of dried laundry and/or empty treating chamber and requesting introducing or removing laundry to/from the treating chamber.

14. The method according to claim 1, further comprising providing a notification of dried laundry and/or empty treating chamber to a remote device which communicates with the laundry drying machine through a wireless communication network.

15. A laundry drying machine comprising:
a treating chamber adapted to contain laundry to be treated; and
a control unit configured to:
- receive a signal ($S_m$) indicative of laundry moisture from a moisture sensor;
- receive a user selection of a laundry treating program comprising a machine initialization phase for detecting physical parameters of the laundry and/or of the laundry drying machine, a program main phase for tumbling the laundry while a heater is ON, and a program final phase for tumbling the laundry while the heater is OFF;
- perform a machine initialization phase including comparing the laundry moisture indicated by the signal ($S_m$) to a first threshold ($THR_1$), which is stored in the control unit and is indicative of dried laundry or an empty treating chamber; and
- upon determining that the signal ($S_m$) is equal to or less than the first threshold ($THR_1$), maintaining the heater OFF while performing one or more of the following:
  - skipping the program main phase by not performing the program main phase and by starting the program final phase, and
  - stopping the laundry treating program by not performing the program main phase and not performing the program final phase.

16. The laundry drying machine according to claim 15, wherein the moisture sensor comprises a couple of electrodes arranged so as to be touched by laundry contained in the treating chamber during a laundry treating program and/or an arrangement forming a capacitor having the laundry as part of its dielectric.

* * * * *